March 13, 1973    R. L. DENNINGHAM    3,720,472

VARIABLE-BAR RESOLUTION TARGET

Filed Oct. 22, 1971    3 Sheets-Sheet 3

INVENTOR
ROBERT L. DENNINGHAM

AGENT

ATTORNEY

United States Patent Office 3,720,472
Patented Mar. 13, 1973

3,720,472
VARIABLE-BAR RESOLUTION TARGET
Robert L. Denningham, Forest Heights, Md., assignor to the United States of America as represented by the Secretary of the Navy
Filed Oct. 22, 1971, Ser. No. 191,696
Int. Cl. G01b 9/00; A61b 3/00
U.S. Cl. 356—124
4 Claims

ABSTRACT OF THE DISCLOSURE

This disclosure is directed to a variable-bar resolution target for use in making resolution measurements on optical devices. The device includes a plurality of elongated flat bars which are secured at their ends to spacer supporting members by suitable pins for rotation relative to the securing pins. The spacer support members are constructed so that each bar is held in a vertical plane spaced from each other with adjacent plates overlapping each other. Therefore, rotation of the spacer support members increases or decreases the overlap of the plates thereby increasing or decreasing the overall width of the target.

BACKGROUND OF THE INVENTION

Resolution measurements on optical devices are often made using targets that have fixed patterns as in a constant-width rectangular bar pattern that has alternate light and dark bars. Patterns may be made in a number of ways; for example, dark bars painted on a light background and black and white prints or transparencies on photographic film. Also, the pattern may be introduced into the optical system of the device in a number of ways. For example, the pattern may be placed at a distance from the device and an image of the pattern may be focused onto the device with a lens. Or, the pattern may be projected onto a screen and then focused onto the device. Also, a photographic transparency may be placed directly on the device, as on the face of a television camera tube, and illuminated from behind. Resolution targets vary in size according to the test being made and the way in which the target is used. Some conventional targets are of the order of one or two inches in size, whereas other targets measure ½ ft. by 2 ft. A well known target consists of two dark wedges separated by a white space geometrically identical to one of the dark wedges. In its use, a rectangular mask is moved from the upper end of the target where the wedge separation is greatest toward the lower end where the wedge separation is least as the target is viewed with the optical device under test. As the mask is moved down a progressively smaller white area between the dark wedge is seen in the optical device. At the point where the white area disappears from view, the mask is stopped and the distance between the dark wedge at that point is called the limit of resolution.

SUMMARY OF THE INVENTION

The variable-bar resolution target is intended for use in making resolution measurements on optical devices. In this target the widths and heights of alternate dark and light rectangular bars can be varied easily and quickly from zero to maximum width, which may be any reasonable arbitrary dimension. The target is a so-called 3-bar target, which refers to the fact that the target has 3 equi-dimensional dark bars on a light background, the 3 dark bars being separated by widths equal to the width of the dark bars. Alternatively, a 3-bar resolution target is also one which has 3 light bars on a dark background. The design of the variable-bar resolution target is such that the bar height is maintained at 5 times the bar width. The purpose of this bar height to bar width relationship is to conform to the Air Force 1951 resolution target dimensions which are commonly used in resolution measurements on optical devices. Resolution measurement results depend on the type of resolution target used; it is therefore desirable to employ a target in common use for purpose of comparison of results.

STATEMENT OF THE OBJECTS

It is therefore an object of the present invention to provide a variable-bar resolution target with which a large range of bar sizes can be effected with one target.

Another object is to provide a resolution target by which the bar sizes may be continuously variable which permits setting of any desired bar width from 0 to the maximum width.

Still another object is to provide a resolution target in which the bar sizes may be varied in one target while being viewed with an optical device under test.

Yet another object is to provide a variable resolution target wherein the bar sizes can be adjusted remotely by an observer.

Various other objects and advantages of the present invention will appear from the following description of an embodiment of the invention and the novel features will be particularly pointed out, hereinafter, in connection with the appended claims as well as being obvious from the drawings.

DESCRIPTION OF THE DEVICE

Figure 1:
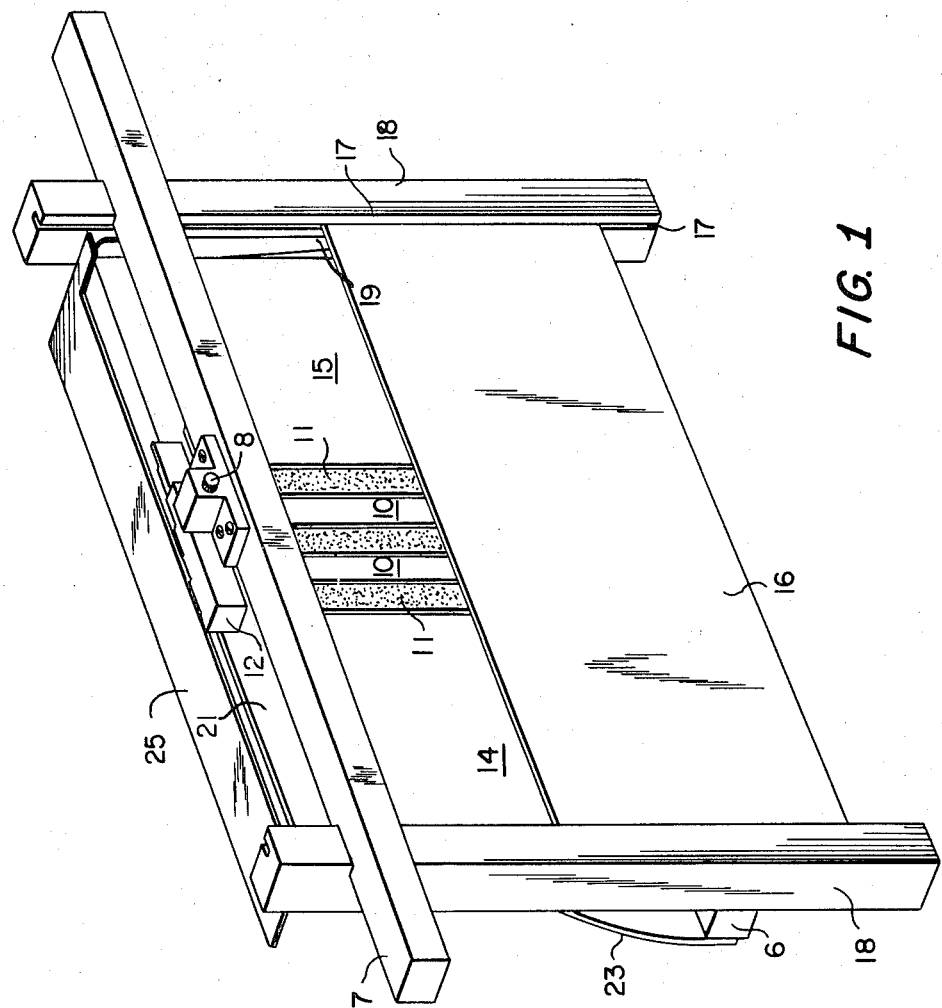
FIG. 1 illustrates a perspective view of the device.
Figure 2:
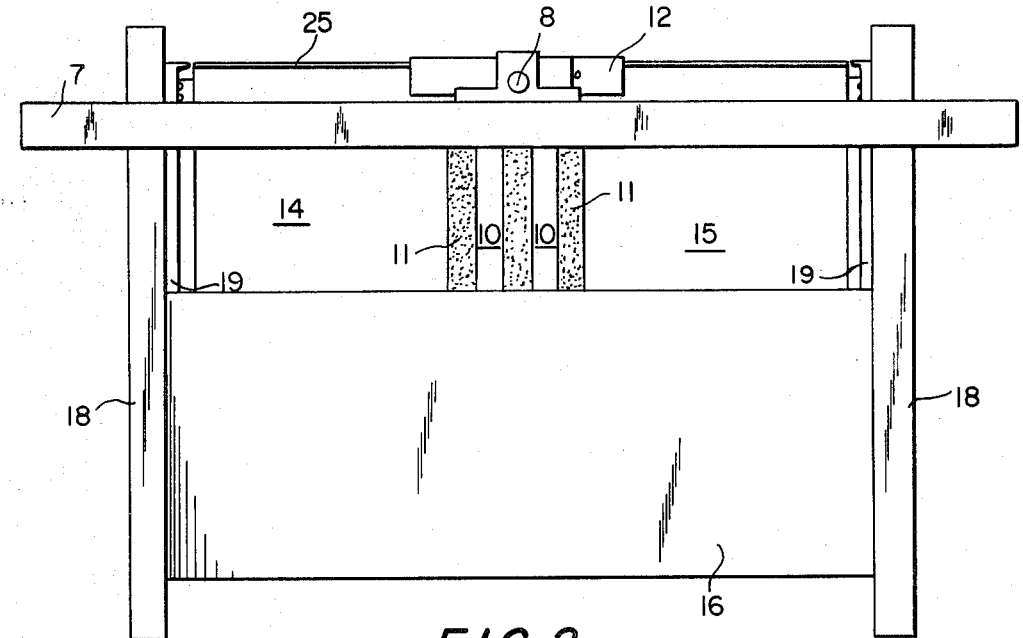
FIG. 2 illustrates a front view.
Figure 3:
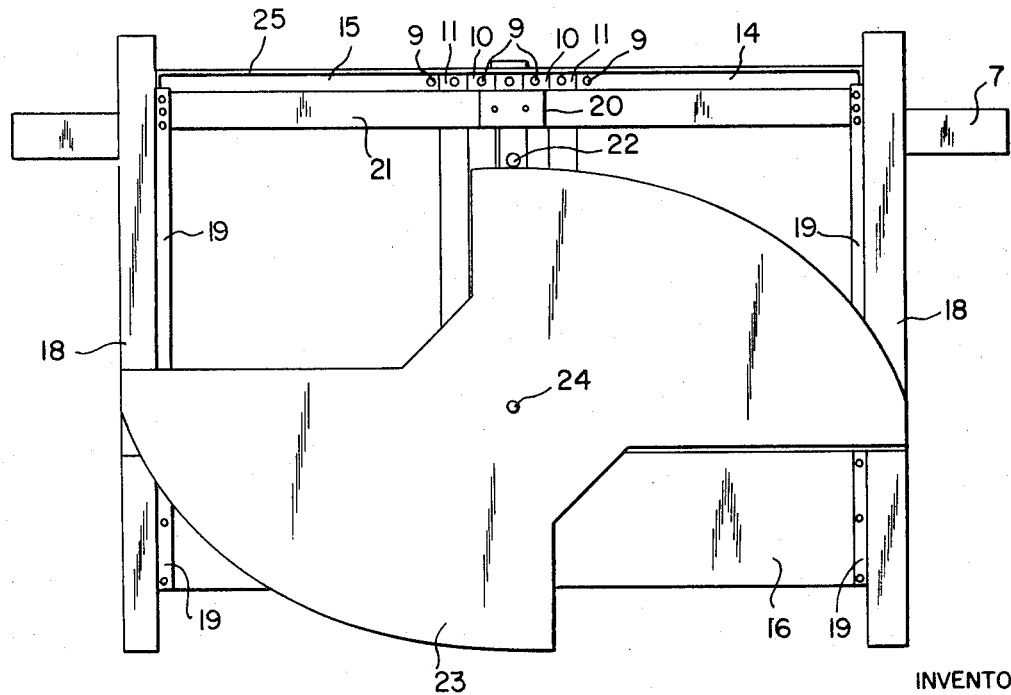
FIG. 3 illustrates a back view.
Figure 4:
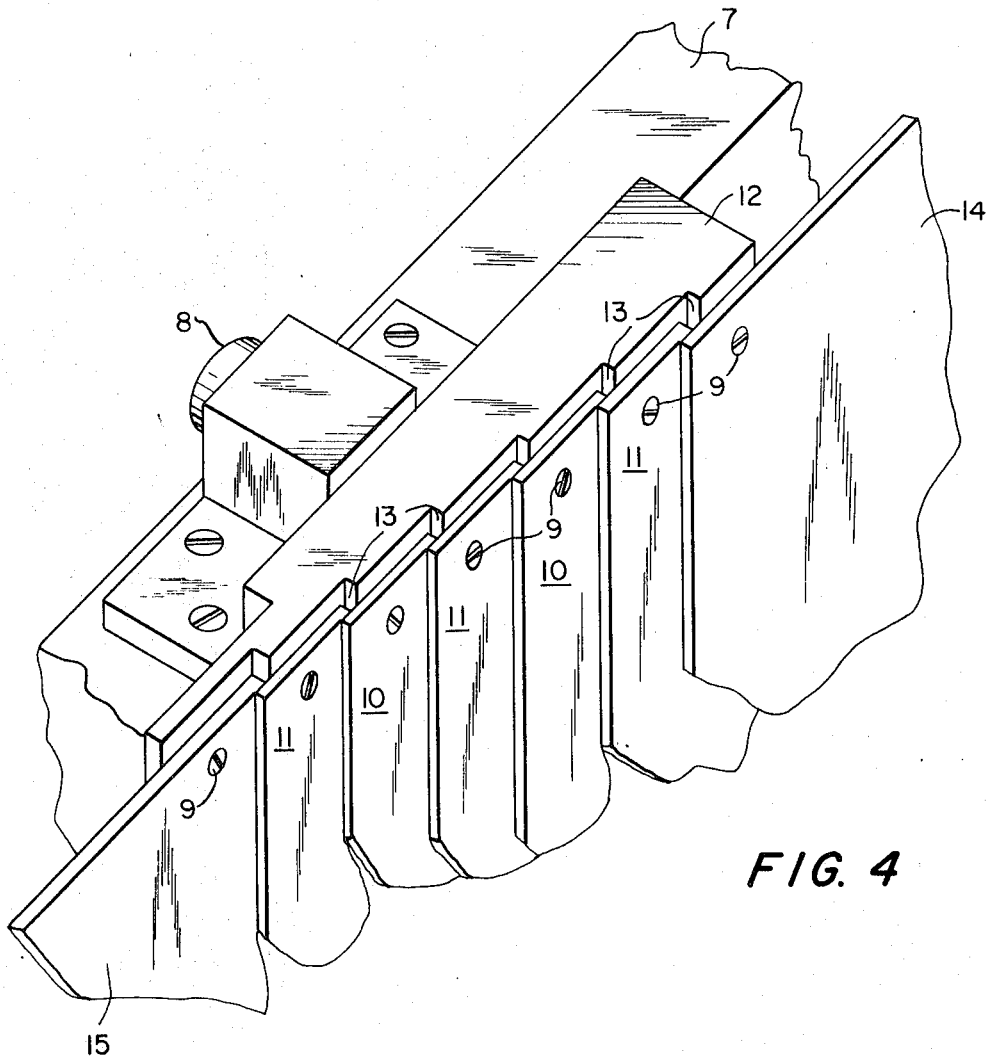
FIG. 4 is an enlarged portion of a perspective view looking toward the upper end from the back.
Figure 5:
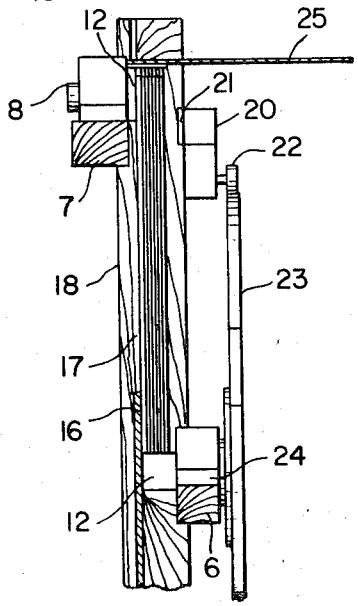
FIG. 5 is a cross sectional view which illustrates the relative parts.

A plurality of similar elongated narrow resolution bars or rectangular slats 10 and 11 are pivotably attached by a single attachment 9 at each end on their center line to separate parallel spacer support elements 12 at equally spaced points along the length thereof such that the edge of adjacent bars slightly overlap each other. Each of the spacer support elements are provided with equally spaced stepped cutouts 13 to provide spacers between the bars. Each of the spacer steps dimensions are such that each bar is held in equally spaced parallel planes which are displaced by a fixed distance from the plane of the adjacent bar. The parallel spacer support elements 12 are secured for 90° rotation about an axis which bisects its length and is parallel to the axis of rotation of the bars through use of shafts 8. Two plates 14 and 15 having the same height as the narrow bars but of much greater width are pivotably secured, one each, to each end of the parallel spacer support elements. The upper and lower ends of the wide plates are connected to the spacer support elements such that their connections are the same distance from the outer edge to the point of attachment as the distance is from the edge of one of the narrower bars to its point of attachment. Thus, the edges of the wide plates will overlap the narrow bars, the same distance that the bars overlap each other. When the spacer support elements are positioned such that the axis of the bars are normal with the spacer support elements, the bars will be in their position with the least overlap. As the spacer support elements are rotated toward a 90° rotation about their axis, the bars will increasingly overlap each other. When the spacer support elements reach a 90° rotation the bars will be at their point of greatest overlap. Therefore, it is seen that as the spacer support elements are rotated about their axis, the bars will increasingly or decreasing overlap each other depending on the direction of rotation of the spacer support elements. In the described device, the bars are alternately dark (11) and light (10) (black, and white) with the two wide plates 14 and 15 being light in color. Therefore, as shown there will be three dark, and two light colored narrow bars alternately separated from each other, with the two large white plates on each outer side of the outermost dark narrow bars. The spacer support elements may be made of one piece as shown, with each successive step the same height or the spacer support elements may be rectangular with separate spacers separating the bars from the support elements to a desired distance. The spacing is made such that the plates will just pass each other as the support elements are rotated to increasingly or decreasingly change their overlap relationship. The upper spacer support element is secured by a support 7 on the front and the lower spacer support element is supported by a support 6 on the back. The upper and lower spacer elements are reversed so that the resolution bars will align vertically when secured in place.

Some resolution targets require that the width of the resolution bars be changed while their length remains the same. However, there are some that require the width and length to change at the same rate thereby exposing a square area.

In order to change the length of the target while the width is changed, there is provided a front cover plate 16 that is moved upwardly in front of the resolution bars to cover a portion of the resolution bars as their width is changed. The cover plate has a length sufficient to extend across the entire width of the resolution bars and a width sufficient to cover the entire length of the resolution area of the bars. The ends of the cover plate slide along grooves 17 in a frame 18 at the ends and the cover plate is provided with a bracket 19 that extends toward the back and upwardly to a cross bar 21 to which a cam follower 22 is secured by a block 20. The cam follower is secured such that it will ride along the surface of a specially formed cam 23 which is rotated by a shaft 24 as the spacer support elements are rotated in order to lift the cover plate. The cover plate covers a portion of the lengths of the resolution bars as the overlap of the resolution bars is increased relative to each other.

The cam is specially formed such that the distance from the pivot point to its outer surface increases from the zero angular position of the spacer bars to a 90° rotation of the spacer support elements. Thus, when the spacer support elements are in a normal position the cover plate will not overlap any of the length of the resolution bars. As the cam is rotated along with an angular change in the setting of the spacer support elements, the distance from the pivot point of the cam to the outer cam surface increases thereby raising the cam follower and the cover plate in front of the resolution target. Simultaneous with rotation of the spacer support elements, the resolution target bars will increase their overlap. Thus, the resolution target is decreased in size, in total width, by overlap of the bars and, in length, by movement of the cover plate to cover a portion of the length of the resolution bars.

The sliding front cover plate or sliding screen is placed in front of the resolution bars such that the exposed length of each plate is five times its width. The dimension of the cam is such that the front cover plate or sliding screen always exposes a bar height equal to five times the bar width. Since there are two white and three dark bars making a total of five bars the area of the bars viewed will always be a square.

The cam is made such that when the spacer support elements are parallel, with the resolution bars normal to the spacer support elements, the cam follower rides on the cam and the distance from the pivot to the outer surface of the cam is such that the sliding front cover plate is all the way down to expose the proper length of the resolution bars. In this position the resolution bars are positioned with their least overlap. The cam is made such that the distance from the pivot point to the outer surface increases in length over an angular width of 90°. The increase in distance is similar to a spiral which increases its distance away from the center as the spiral increases in length over an angular distance of 90°. The linear distance between the pivot point of the cam and the outer surface of the cam is such that when the cam is fixed for rotation with the spacer support elements, the front cover plate will move across the length of the resolution bars the same distance as the resolution bars overlap to decrease their width between the outermost edges of the outer black resolution bars. The resolution bars increase and decrease their overlap depending upon the direction of rotation of the spacer support elements. Likewise, the cam moves the cam follower and the cover plate up or down depending upon the direction of rotation of the cam which is rotated simultaneous with the spacer support elements. The cover plate completely covers the resolution bars when the spacer support elements have been rotated through 90° from a normal position. In this position, the narrow resolution bars completely overlap each other and will appear as one. If the front cover plate is not used, the resolution plates would appear as solid white with no black showing. Also, with the cover plate being used, there will appear a solid white since the front cover plate is a solid white.

Since the front cover plate rides in grooves along its outer edges, there may be a binding force as the cam lifts the plate. Therefore, a counter-weight 25 may be added to extend beyond the cam follower in order to balance the front plate. With the counter-weight, the front plate should ride along the grooves without binding or with greater ease.

As can be seen from the above, the resolution target may be used with or without the front cover screen and the resolution plates are variable to provide a large range of different sizes. The target may be varied while in use to provide different sizes as well as being set for one specific size. Further, the target may be equipped with a direct motor drive for rotation of the spacer support elements and the cam thereby providing remote control for varying the widths. A pulley wheel on the rotating shaft of the spacer bar equipped with an appropriate pulley line will work for remote control, as well as by a motor by use of a belt.

The parts are mounted wtihin a frame having slotted sides for the front screen to slide in and with one back and one front support bar to which bearings are mounted for mounting the spacer support elements for rotation with a shaft extending therefrom. The cam and means for rotation of the spacer support elements are also secured to the shaft for rotation simultaneously with rotation of the spacer support elements.

In operation, the spacer support elements are positioned in a horizontal position such that the white and black resolution bars are vertical and spaced their least overlap. The instrument to be checked is spaced a specific distance from the resolution target in a constant surrounding light. The resolution bars are rotated in the vertical plane thereby constantly overlapping a portion of each plate as the bars are rotated. The bars are rotated until the white and black plates cannot be resolved or distinguished as separate plates in the image produced by the optical device under test. Thus, the resolution bars are positioned at their narrowest width at which the separate bars cannot be distinguished. This is the limit of resolution of the instrument which is specified in lines per millimeter or line pairs per millimeter.

Instruments useful for night vision are commonly used. These instruments contain batteries and image intensifier tubes which deteriorate with use resulting in a loss of the resolving capability of the instrument. Therefore, these instruments need be checked periodically. Thus, the variable bar resolution target of this invention is useful for such tests. The device may be constructed to directly display a figure of merit for night vision devices by placing graduation marks on the cam, the plates, or any other convenient moving part. The resolution target may be operated remotely by use of a motor where the same operator may test the instrument and vary the resolution target during the test.

Obviously an instrument may not always be tested under the same lighting conditions. Therefore, one may prepare a curve or tables from which one may determine the maximum resolvable bar width requirement for a particular light level. In carrying out a test of the accuracy of the solution limit of an instrument or to check an instrument under these conditions one would require the use of a simple brightness or luminance meter to determine the background light level at which the measurement is made. Thus, by knowing the light background and by use of a curve or table one may readily determine or check the resolution limit of an instrument by use of the present variable bar resolution target.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A variable bar resolution target for use in making resolution measurements on optical devices, which comprises:
   a pair of spacer support means spaced from each other and secured for rotation in the same plane,
   each of said spacer support means including equally spaced spacers thereon each of progressively greater thickness from one end,
   a plurality of narrow resolution bars secured to said spacers on each of said spacer support means near the ends of their center lines for pivotal movement relative to said pair of spacer support means,
   said resolution bars being positioned on different planes which are displaced a fixed distance from the plane of the adjacent bar with each successive bar overlapping the edge of its adjacent bar,
   said resolution bars having alternating dark color and light color bars with one color being one greater in number than the other color, and
   means for rotating said pair of spacer support means for increasing or decreasing the overlap of said resolution bars.

2. A variable-bar resolution target as claimed in claim 1, which includes a pair of plates secured one each to opposite ends of each of said spacer support means, and each of said plates have a much greater width than the resolution bars in between said pairs of plates.

3. A variable-bar resolution target as claimed in claim 2, which includes:
   a sliding screen positioned on a plate in front of said resolution bars and said pair of plates and having a length of at least the length of said resolution bars and a width which is greater than the overall width of the total number said plurality of narrow resolution bars,
   and means for moving said sliding screen across the length of said plates to cover the entire width of said target and at least a portion of the length thereof simultaneous with increasing or decreasing the overlap of said resolution bars.

4. A variable-bar resolution target as claimed in claim 3, wherein:
   there are five resolution bars secured between said end plates,
   each of said five resolution bars are of a length which is five times their width,
   said sliding screen covers the length of said plates at a rate such that the exposed length is always five times the exposed width of each resolution bar between the end plates.

References Cited
UNITED STATES PATENTS 3,477,779    11/1969    Mitsuishi _____ 351—34

RONALD L. WIBERT, Primary Examiner

C. CLARK, Assistant Examiner

U.S. Cl. X.R.

351—34